United States Patent [19]

Pavur et al.

[11] Patent Number: 5,338,138
[45] Date of Patent: Aug. 16, 1994

[54] STUD MOUNTING CLIP FOR PANEL

[75] Inventors: Carol P. Pavur, Warren; Martin W. Schnurr, Grosse Pointe City, both of Mich.

[73] Assignee: Chrysler Corporation, Highland Park, Mich.

[21] Appl. No.: 58,843

[22] Filed: May 10, 1993

[51] Int. Cl.$^5$ .............. F16B 37/02; F16B 39/00; B25G 3/00
[52] U.S. Cl. .................. 411/107; 411/175; 411/970; 411/999; 403/397; 403/406.1
[58] Field of Search .......... 411/107, 112, 174, 175, 411/970, 999; 403/397, 406.1, 407.1, 408.1

[56] References Cited

U.S. PATENT DOCUMENTS

| | | | |
|---|---|---|---|
| 1,930,187 | 10/1933 | Abronshi | 189/35 |
| 2,363,210 | 11/1944 | Tinnerman | 411/175 |
| 2,378,258 | 6/1945 | Tinnerman | 411/174 |
| 2,654,411 | 10/1953 | Bedford, Jr. | |
| 2,748,906 | 6/1956 | Flora | 189/35 |
| 2,781,073 | 2/1957 | Trafton | |
| 2,824,465 | 2/1958 | Riley | 74/526 |
| 3,283,794 | 11/1966 | Steward et al. | 411/970 X |
| 3,463,432 | 8/1969 | Ptak | 248/228 |
| 4,396,326 | 8/1983 | McKinnie et al. | 411/103 |
| 4,408,939 | 10/1983 | Graff et al. | 411/112 |
| 4,643,610 | 2/1987 | Bien | 403/407.1 |
| 4,729,706 | 3/1988 | Peterson et al. | 411/175 |
| 4,798,507 | 1/1989 | Olah | 411/175 |

FOREIGN PATENT DOCUMENTS 407282 1/1991 European Pat. Off. ............ 411/174

Primary Examiner—Neill R. Wilson
Attorney, Agent, or Firm—Edward P. Barthel

[57] ABSTRACT

A U-shaped stud mounting clip adapted for securing an projecting stud to a panel by means of an edge thereof formed with an upstanding flange. The resilient clip is stamped from sheet metal and has an elongate, generally U-shaped bifurcated configuration defining an upper contoured leg and a lower planar leg having their proximate ends joined by a bight wall. The upper leg has a first proximate sloped portion, a second angled portion, a third platform means, and a fourth lead-in distal portion. The platform means fixedly supports a projection stud thereon. The clip is flexed over the panel upstanding flange enabling a retaining tongue, struck from the clip upper leg sloped portion, to capture the clip on the panel flange while allowing the clip stud to be moved along the panel upstanding flange in a predetermined adjustable manner.

4 Claims, 4 Drawing Sheets

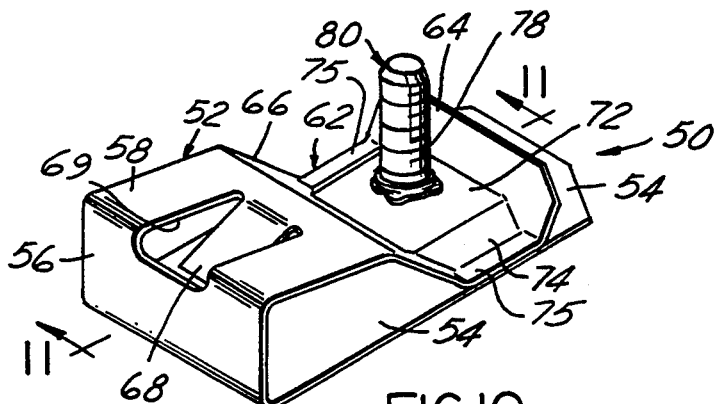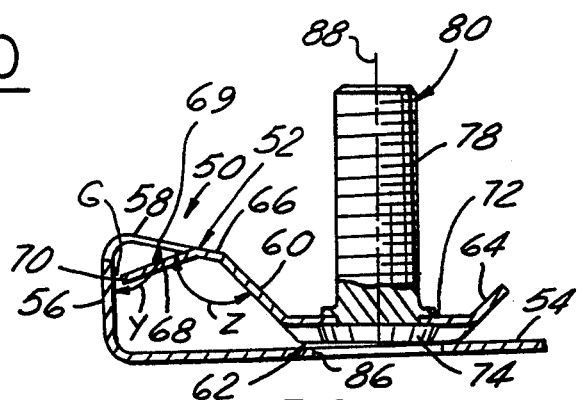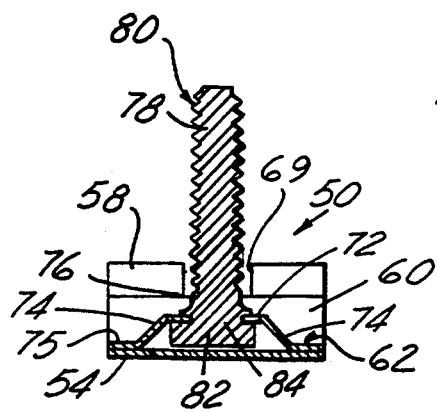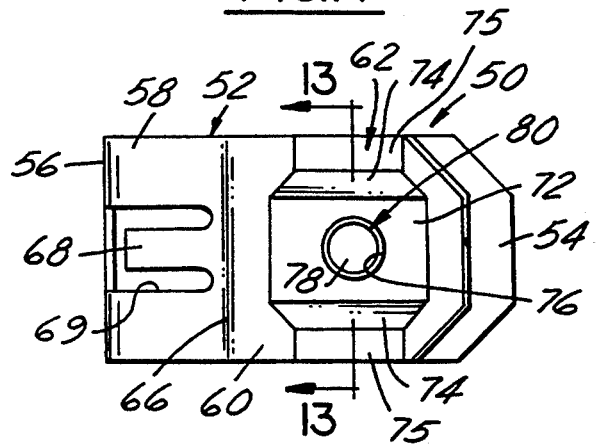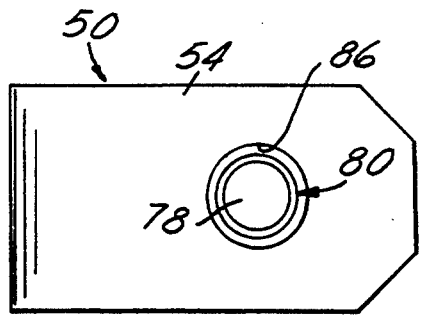

STUD MOUNTING CLIP FOR PANEL

BACKGROUND OF THE INVENTION

This invention relates to fastening clips and more particularly to a resilient mounting clip arrangement for securing a projection stud on a panel such as a sheet metal vehicle body panel.

The prior art is replete with resilient metal clip fastening or retaining arrangements. U.S. Pat. No. 4,729,706 issued Mar. 8, 1988 to Peterson et al. discloses a fastener clip having two legs adapted to be pushed onto an edge of sheet materials of varying thicknesses. The clip first leg has a U-shaped elongated tongue cut from it and bent towards the second leg to fictionally engage a sheet material disposed between the two legs while the second leg has an integral threaded barrel for receiving a bolt. The U-shaped tongue is formed with offset bends to allow the tongue to yield when the clip is mounted on a thicker sheet material.

The following is a list of patents disclosing various types of resilient fastener clip arrangements: U.S. Pat. No. 1,930,187 issued Oct. 10, 1933 to A. F. Abroanske; U.S. Pat. No. 2,654,411 issued Oct. 6, 1953 to W. A. Bedford, Jr.; U.S. Pat. No. 2,748,906 issued Jun. 5, 1956 to L. H. Flora; U.S. Pat. No. 2,781,073 issued Feb. 12, 1957 to W. L. Trafton; U.S. Pat. No. 2,824,465 issued Feb. 25, 1958 to J. T. Riley, Jr.; and U.S. Pat. No. 3,463,432 issued Aug. 26, 1969 to W. F. Ptak.

SUMMARY OF THE INVENTION

It is an object of the present invention to provide a resilient stud mounting clip that is relatively easy, efficient and inexpensive to utilize.

It is another object of the present invention to provide a resilient stud mounting clip for ready attachment on a panel wherein the clip may be moved along an associated edge portion of the panel to adjustably position projection stud in a predetermined manner.

It is another object of the present invention to provide a resilient stud mounting clip as set forth above wherein the clip is adapted for ready capture on a peripheral upstanding flanged edge of the panel.

It is still another object of the present invention to provide a resilient stud attaching clip as set forth above wherein an after-market vehicle service department or the like may readily and inexpensively replace a missing welded projection stud at a predetermined location along the panel flanged edge.

An illustrative embodiment of the stud mounting clip, disclosed in the following specification, involves a cover plate closing an access opening. The opening, formed in the floor pan of the vehicle trunk, is defined by an upstanding perimeter flange. Removal of the cover plate allows a mechanic to service or replace an in-tank fuel pump via the access opening without removing the fuel tank. The cover plate is normally secured by projection weld studs, spaced around the panel opening, which extend through aligned holes in the cover plate. Upon a nut being torqued-down on each of the threaded studs, a foam rubber gasket bonded to cover plate underside is subjected to approximately fifty percent depression assuring an air tight seal.

To avoid the drilling of mounting holes, the vehicle floor pan projection weld studs are mounted around the access aperture periphery by automated equipment. The stud attaching clip of the present invention provides an inexpensive aftermarket or field repair fix for lost or damaged weld studs obviating the need to drill holes in the floor pan. Further, the stud attaching clip provides the required strength and reliability needed to seal close the access aperture.

In accordance with the present invention, a composite stud attaching clip comprises a resilient one piece sheet metal clip and a threaded stud. The resilient clip has an elongate, generally U-shaped bifurcated configuration defining an upper contoured leg and a lower planar leg having their proximate ends joined to an upstanding bight wall. The upper leg comprises a first proximate angled portion, a second downwardly sloped portion, a third inverted-trough shaped portion supporting a projection stud, and a fourth upwardly bent portion providing a lead-in cleft. The clip is adapted to be flexed over an upstanding flange bordering the aperture such that a retaining tongue, struck for the upper leg angled portion, captures the clip in a predetermined manner. Applicants' invention allows the clip to be moved along the flange enabling its upwardly projecting stud to be adjustably positioned for alignment with an associated hole in the cover plate.

BRIEF DESCRIPTION OF THE DRAWINGS

These and other objects, features and advantages of the invention, will appear from the following written description and the accompanying drawings in which:

FIG. 10 is an perspective detail view of the fastener clip of the of the present invention;

FIG. 11 is a side view, partly in cross section taken substantially on the line 11—11 of FIG. 10;

FIG. 12 is a top detail view of the fastener clip of FIG. 11;

FIG. 13 is a vertical sectional view taken on the line 13—13 of FIG. 12; and

FIG. 14 is a bottom detail view of the fastener clip of FIG. 11.

DETAILED DESCRIPTION OF THE INVENTION

Figure 1:
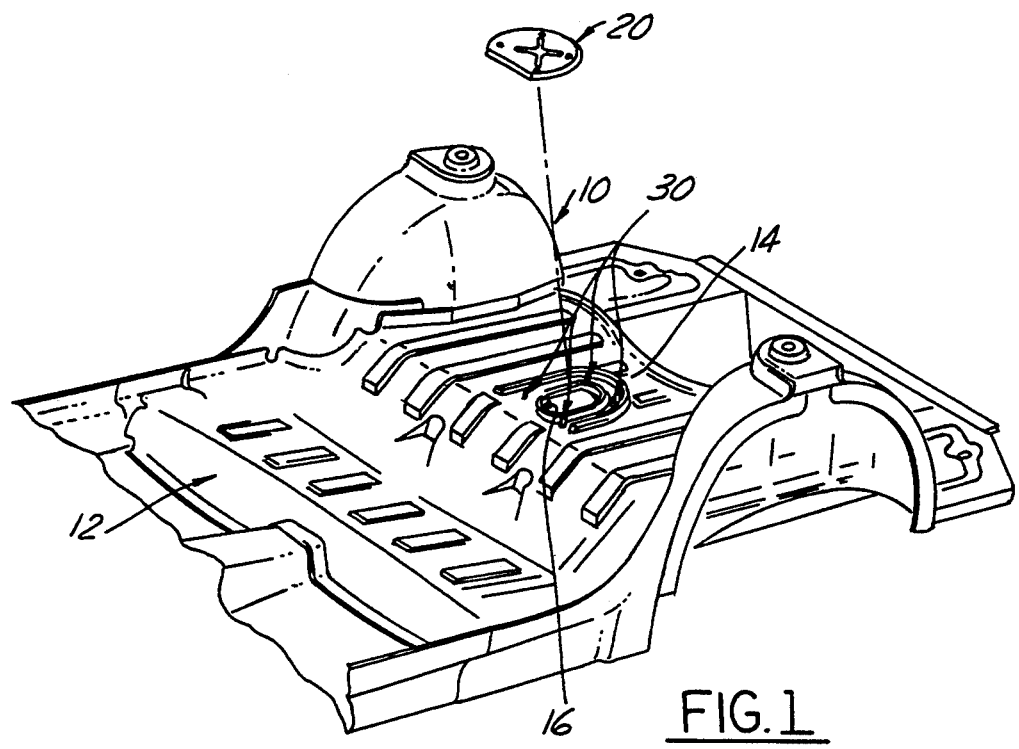
FIG. 1 is a fragmentary exploded perspective view of a vehicle floor pan formed with an access aperture adapted to be closed by a cover plate in accordance with the present invention.
Figure 3:
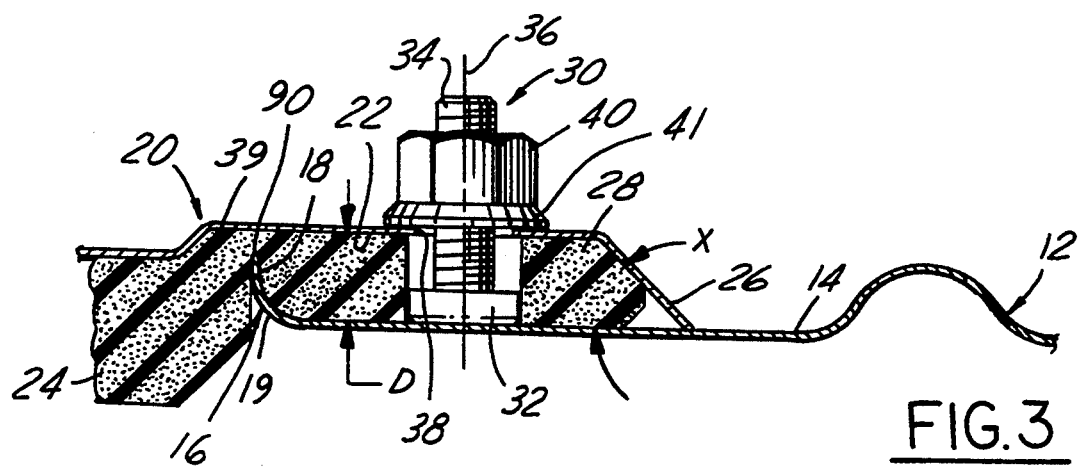
FIG. 3 is an enlarged vertical cross sectional view of a weld stem, installed during a vehicle assembly line operation, used to secure a cover plate on a vehicle floor pan access aperture.
Figure 4:
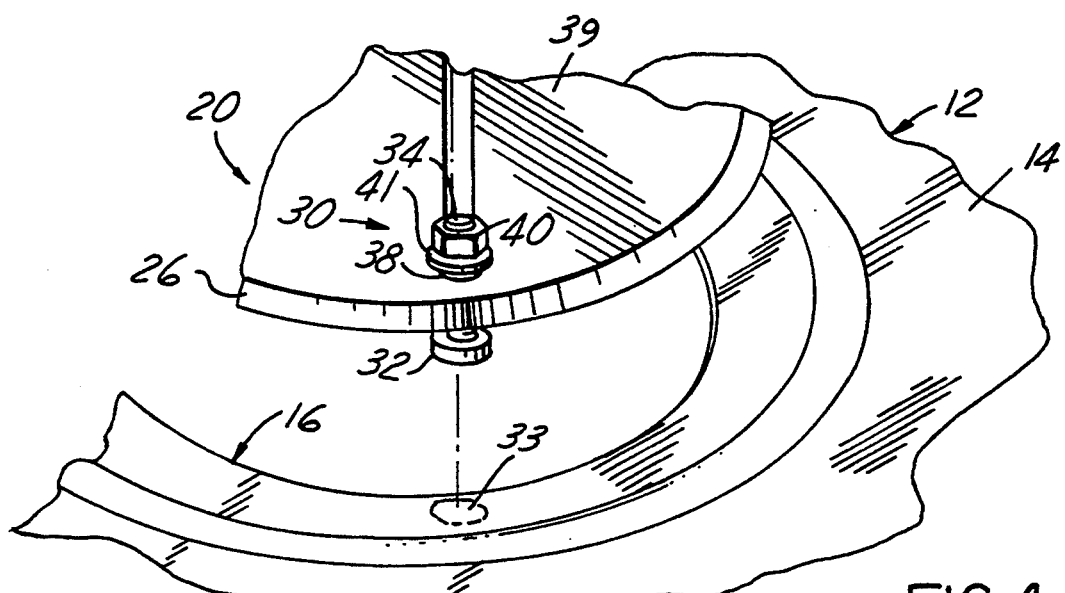
FIG. 4 is a fragmentary perspective view showing a cover mounting weld stem broken-off from an apertured panel.
Figure 5:
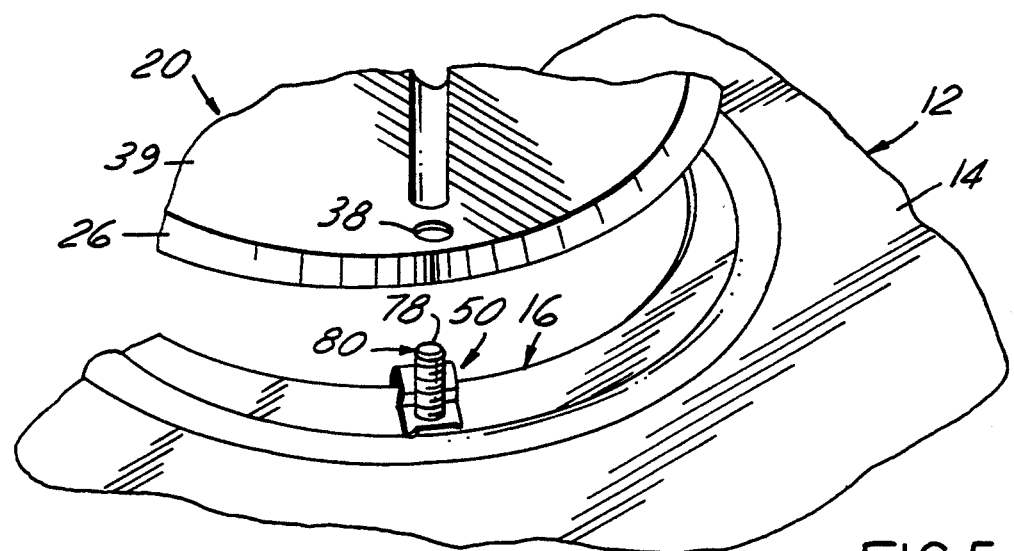
FIG. 5 is a fragmentary perspective view, similar to FIG. 4, showing a repair fastener clip of the present invention replacing the broken weld stem of FIG. 4.

Referring now to the drawings, and in particular to FIG. 1, a generally conventional vehicle body, partially indicated at 10, provided with a sheet metal floor pan shown generally at 12. The floor pan 12 includes a raised trunk floor panel 14 formed with a generally circular-shaped access aperture indicated at 16 in FIGS. 3-5. As best seen in FIG. 3, the aperture 16 is formed with a peripheral upstanding edge flange 18, disposed normal to the panel 14, defining a rounded or radiused juncture 19 therewith.

Figure 2:
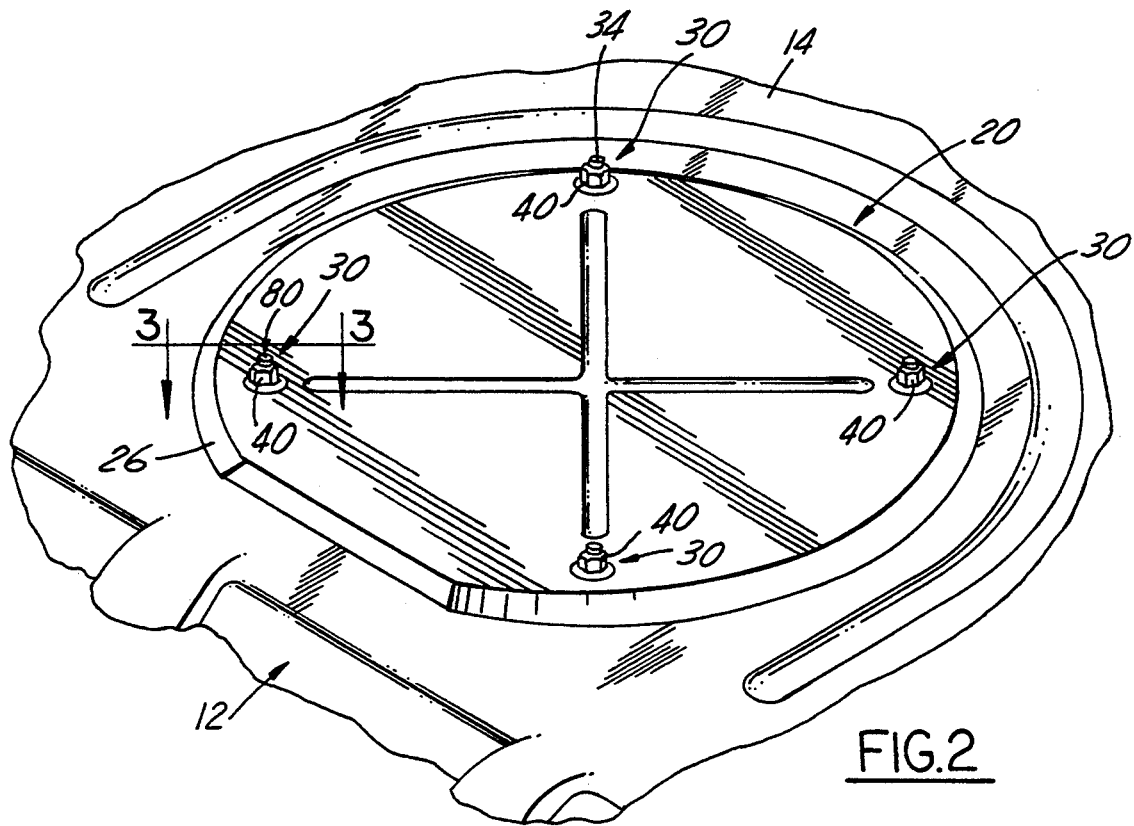
FIG. 2 is a fragmentary enlarged perspective view of a portion of the floor pan showing the aperture closed by the cover member wherein at least one nut engages at threaded stem of a repair fastener clip of the present invention.

With reference to FIGS. 1 and 2, a cover plate, generally indicated at 20, is shaped in a complementary overlying manner to enclose the aperture 16 while resting on the upper surface of the panel 14. It will be noted in FIG. 3 that the entire undersurface 22 of the cover plate is provided with a conforming pad of compressible elastomeric sealing material 24, such as foam rubber, suitably secured to the undersurface 22 as by adhesive bonding. FIG. 3 shows the cover plate 20 formed with a terminal beveled flange portion 26 having its free edge 27 resting on the panel upper surface. The beveled flange defines a predetermined acute angle "X" with the panel surface.

The sealing pad 24 peripheral portion has a predetermined thickness which is slightly greater than the vertical dimension "D" between the cover plate cap portion 39 and the underlying panel 14. It will be noted in FIG. 3 that the dimension "D" is established upon beveled flange free edge 27 contacting the panel 14. Thus, upon the cover plate 20 being secured in place the foamed material 28 is compressed insuring the aperture 16 is sealed in an air tight manner with the aperture flange 18.

FIGS. 2 and 3 depict the panel 14 provided with a plurality of weld studs 30 positioned in a spaced manner around the access aperture 16. As best seen in FIG. 3, each weld stud formed with a circular head 32 having its flat top welded by automated equipment to the upper surface of the panel 14. The equipment welds the head 32 at a predetermined panel location, shown at 33 in FIG. 4, such that its threaded stem 34 is positioned on a vertical axis 36. Thus, upon an installer locating the cover plate 20 over the aperture 16, each weld stem 34 is aligned with an associated cover plate hole 38. A hex-nut 40, having an enlarged integral collar 41, is tightened on each weld stem 38, compressing the cover outer seal portion 28 into biased air-tight contact with the panel aperture flange 18.

It will be appreciated that during the service life of the vehicle one or more of the weld studs 30 may need to be replaced, as for example, by the breaking-away of a weld stud from its predetermined welded location 33. Applicants' unique stud attaching clip 50 enables a missing weld stud 30 to be readily replaced at a vehicle service department or the like obviating the need to use welding equipment.

With reference now to FIGS. 10 and 11, there is shown a stud attaching clip 50 formed from a single flat piece of sheet metal having an elongate, generally U-shaped bifurcated configuration as defining an upper contoured leg 52 and a lower planar leg 54. The legs 52 and 54 are joined together at their inner proximate ends by a connecting bight wall 56 which extends vertically upwardly a predetermined dimension from the lower leg 54 defining a right-angle therewith. The upper leg 52 is formed with a first proximate angled portion 58, a second intermediate sloped portion 60, a third platform means 62, and a fourth leading upwardly bent distal portion 64. Angled portion 58 is shown sloped downwardly from the bight portion 56 defining a acute included angle "Y" therewith of the order of 80 degrees. The intermediate sloped portion 60 extends downwardly from the angled portion 58 at an included obtuse angle "Z" of the order of 140 degrees.

FIGS. 10-12 depicts the first angled portion 58 separated from the sloped portion 60 by a transverse bend juncture 66. The angled portion 60 has a flexible retainer tongue 68 lanced therefrom defining a rectangular cutout 69. FIG. 11 shows the tongue slanting downwardly from a point adjacent the bend juncture 66 toward the interior surface of the bight portion 56. In the disclosed form, the tongue 68 defines an acute angle of about 15 degrees from the horizontal. It will be seen in FIG. 11 that free transverse edge 70 of the tongue 68 is spaced a predetermined dimension from the interior surface of the bight portion 56. The space defines a gap "G" having a predetermined dimension substantially equal to but slightly greater than the thickness of the upstanding edge flange 18. The tongue gap "G" is thus adapted to receive in a locked fashion the panel aperture upstanding edge flange 18 in a manner to be described.

With reference to FIGS. 10-13, it will be seen that the clip fastener platform means 62 is in the form of an inverted trough-shaped portion defining a central raised platform 72 formed with mirror image depending or downwardly tapered sides 74 each terminating in a foot flange 75. The platform 62 and feet 75 are in parallel relation whereby the foot flanges 75 are resiliently biased in flatwise contact with the opposed interior surface of the lower leg 54. The platform 72 has a central polygonal shaped aperture 76 through which projects an upwardly extending threaded stem 78 of a clip fastener stud.

The clip fastener stud, generally indicated at 80, also comprises a head 82 positioned on the underside of the clip raised platform 72. The stud has a polygonal sided collar 84 at the base of its stem 78 fixedly secured in the aperture 76 as by staking portions indicated at 83 in FIG. 11. As seen in FIG. 13, the stud head 82 is positioned in a "countersunk" manner on the underside of the raised platform 72. The stud polygonal sided collar portion 84 conforms to the aperture 76 retaining the stud 80 from rotating relative to the clip 50. In the disclosed from of the invention, the stem is secured in the platform aperture by a staking operation. It will be noted in FIG. 14 that the lower leg 54 is provided with a central access hole 86 therethrough having its center aligned on the principal axis 88 of the stem 78.

Figure 6:
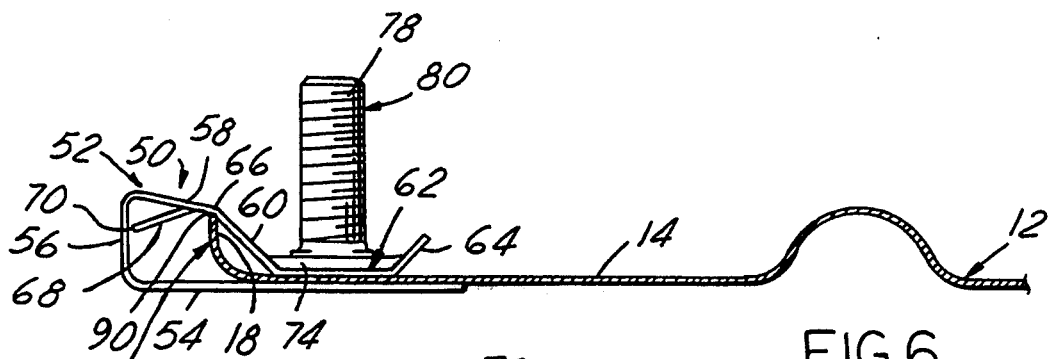
FIG. 6 is an enlarged vertical cross section taken on the line 6—6 of FIG. 5 showing a fastener clip of the present invention partially engaged to the upstanding flange surrounding the floor pan aperture.

In operation, to secure the clip 50 to the panel aperture upstanding flange 18, the clip is disposed at a slight angle to the flange by inserting the flange 18 in a cleft defined between the clip upper leg lead-in distal portion 64 and clip lower leg 54. The installer pushes on the clip causing its resilient upper leg foot sections 75 to flex away from the lower leg 54 positioning the clip 50 with the legs 52 and 54 straddling the panel 14 as seen in FIG. 6. It will be noted that the lower leg 54 is in flatwise contact with the undersurface of panel 14 while the foot sections 75 are in flatwise contact with the panel upper surface. FIG. 6 also shows the free edge 90 of the upstanding flange 18 located juxtaposed the clip bend juncture 66.

Figure 7:
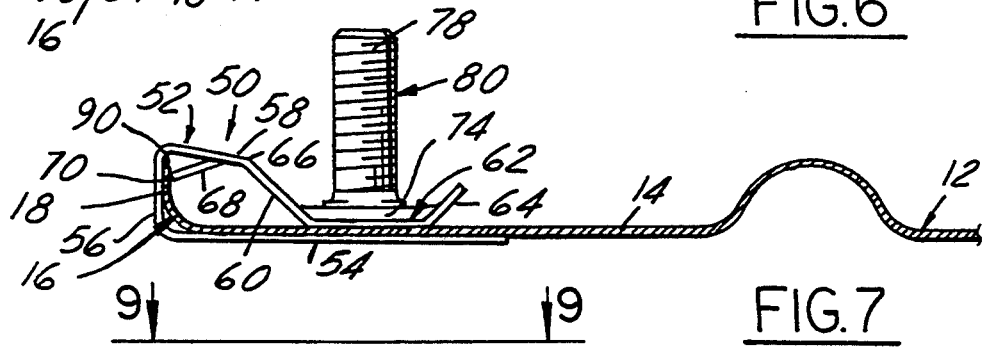
FIG. 7 is a view similar to FIG. 6 showing the fastener clip fully attached to the upstanding flange of the floor pan aperture.

Next, the installer pushes the clip 50 radially outwardly from the aperture 16; i.e., toward the right as viewed in FIG. 6. It will be noted that the tongue free edge 70, in its free state, is positioned a predetermined dimension below the panel flange free edge 90. The resultant horizontal movement of the clip causes the tongue 68 to be flexed upwardly. Thus, as seen in FIG. 7, upon the bight wall 56 abutting the flange 18 the tongue 68 is returned to its normal free state with its free edge 70 in frictional engagement with the interior surface of the flange 18.

Figure 8:
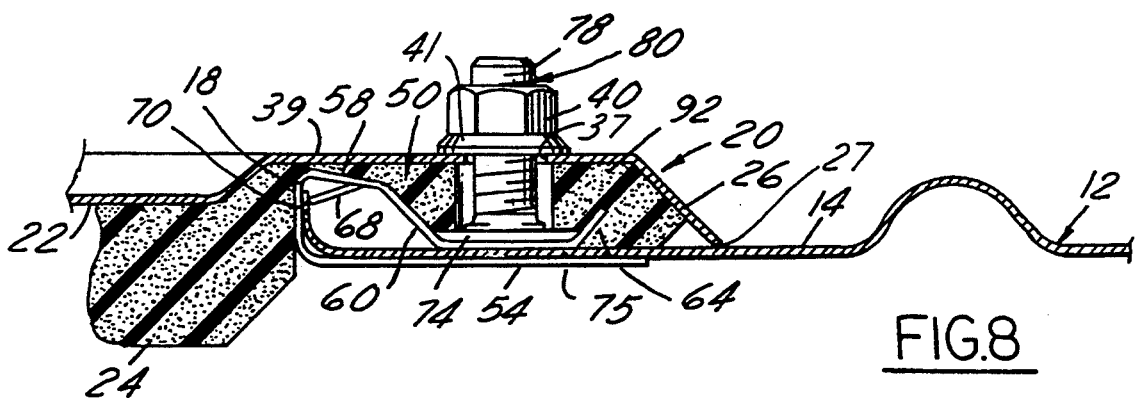
FIG. 8 is an fragmentary vertical cross sectional view taken on the line 8—8 of FIG. 2.
Figure 9:
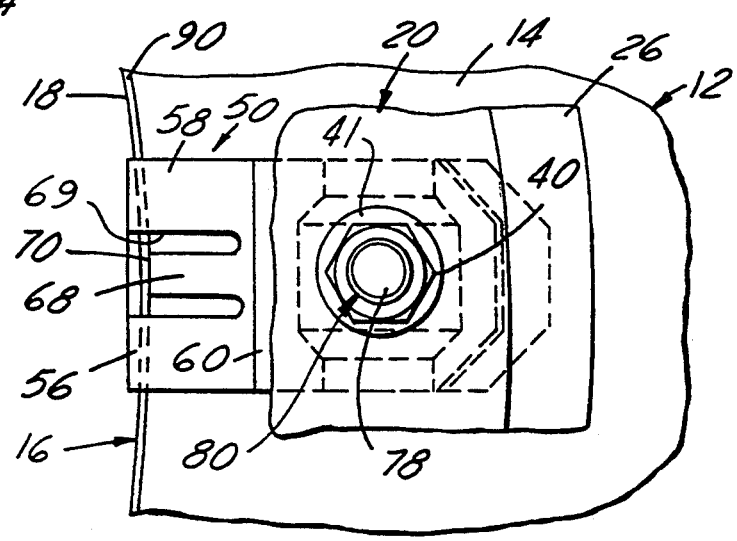
FIG. 9 is a fragmentary top view, with parts broken away, of the fastener clip arrangement of FIG. 8.

With reference to FIG. 8, the panel upstanding flange 18 is shown slidably retained between the tongue free edge 70 and the bight wall interior surface. Thus, it will be appreciated that the clip 50 is free to be moved along the flange 18 in a guided predetermined manner. As a result, the installer can readily position the stem 78 for reception in an associated hole 38 in the cover plate. Upon the flanged nut 40 being tightened on the stem 78, the clip 50 compresses the pad outer periphery 92 thereby insuring an air-tight seal of the access aperture 16. It will be appreciated that the angled portion 58 of the clip functions as a limiting stop thereby insuring against over-torquing of the flanged nut causing the foam pad to provide a diminished sealing capacity.

While the principles of the present invention in connection with the specific stud attaching clip arrangement has been described, it is to be understood the foregoing detailed description has been made by way of example only and not as a limitation to the scope of the invention as set for in the accompanying claims.

What is claimed is:

1. In combination with a vehicle panel having an upstanding flanged edge, a stud mounting clip adapted for securing a projection stud on the panel along a predetermined path coextensive the flanged edge, said stud mounting clip comprising:

a resilient generally U-shaped clip formed from sheet metal having an elongate, generally bifurcated configuration defining an upper contoured leg and a lower planar leg, said legs having inner ends thereof joined by a bight wall, said upper leg having a first proximate angled portion, a second intermediate sloped portion, a third platform means, and a fourth upwardly canted distal portion;

said first angled portion separated from said lower leg providing a space therewith and angled downwardly from said bight wall defining an acute angle therewith, said second sloped portion sloped downwardly from a transverse bend juncture with said first proximate portion defining an obtuse included angle therewith, said third platform means resiliently biased into contact with said lower leg, a projection stud mounted on said platform means a stem projecting vertically upwardly therefrom, said fourth portion being upwardly bent from said second leg so as to define a lead-in converging cleft therewith;

said first sloped proximate portion having a flexible retainer tongue lanced therefrom, said tongue having one end integral with said transverse juncture and angled downwardly from the horizontal into said space, said tongue having its free end positioned a predetermined dimension from said bight wall interior surface defining a gap therewith;

said clip fastener mounted on said panel by being tipped and slid over said panel flange with said flange entering said lead-in cleft, said clip being rotated whereby said flange enters said space such that its free edge is juxtaposed said first transverse bend juncture and said lower leg is in flatwise engagement with an undersurface of said panel and said prong portion foot sections in flatwise contact with said panel upper surface;

whereby upon said clip being slid radially inwardly on said panel said retainer tongue contacting said panel flange causing said tongue to be flexed upwardly enabling said clip bight wall interior surface to contact the panel flange releasing said tongue returning it to its normal state with its free end juxtaposed an interior surface portion of said flange, said clip being captured on said panel flange for co-extensive travel therewith adjustably positioning said stud in a predetermined manner relative to said panel flange.

2. The stud mounting clip as set forth in claim 1 wherein said platform means in the form of an inverted trough-shaped portion having a central raised platform bordered by depending sides, each said depending side terminating in a foot flange resiliently biased into flatwise contact with said lower leg, said platform having an aperture therein receiving a stem portion of said stud therethrough with a stud head portion thereof positioned on the underside of said raised platform, and means fixedly retaining said stud relative to said platform.

3. The stud mounting clip as set forth in claim 2 wherein said stud being staked in said platform aperture.

4. The clip fastener attaching arrangement as set forth in claim 1 wherein said upstanding flange being joined to said panel by a radiused portion.

* * * * *